United States Patent
Lee

(10) Patent No.: US 10,024,219 B2
(45) Date of Patent: Jul. 17, 2018

(54) ENGINE SYSTEM HAVING COOLANT CONTROL VALVE

(71) Applicant: HYUNDAI MOTOR COMPANY, Seoul (KR)

(72) Inventor: Hyo Jo Lee, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/182,683

(22) Filed: Jun. 15, 2016

(65) Prior Publication Data
US 2017/0145896 A1    May 25, 2017

(30) Foreign Application Priority Data
Nov. 19, 2015    (KR) .................. 10-2015-0162679

(51) Int. Cl.
*F01P 7/14*    (2006.01)
*F01P 7/16*    (2006.01)

(52) U.S. Cl.
CPC ........... *F01P 7/16* (2013.01); *F01P 2007/146* (2013.01)

(58) Field of Classification Search
CPC ........... F01P 7/16; F01P 2007/146; F01L 1/04
USPC ...................................... 123/41.08
See application file for complete search history.

(56) References Cited

U.S. PATENT DOCUMENTS

| | | | | |
|---|---|---|---|---|
| 4,410,133 A * | 10/1983 | Furukubo | ............... | F01P 7/165 236/100 |
| 4,948,043 A * | 8/1990 | Kuze | .................... | G05D 23/021 236/100 |
| 5,119,061 A * | 6/1992 | Kuze | .................... | G05D 23/021 236/100 |
| 5,385,296 A * | 1/1995 | Kurz | .................. | G05D 23/1393 236/34.5 |
| 5,992,755 A * | 11/1999 | Kuze | .................. | G05D 23/1333 236/34.5 |
| 6,189,798 B1 * | 2/2001 | Sano | ........................ | F01P 11/16 236/34.5 |
| 6,764,020 B1 * | 7/2004 | Zhao | .................... | G05D 23/022 123/41.1 |
| 7,275,697 B2 * | 10/2007 | Roman | ................ | G05D 23/023 137/591 |

(Continued)

FOREIGN PATENT DOCUMENTS

JP    2002-181226 A    6/2002
JP    2013-517416 A    5/2013

*Primary Examiner* — Hung Q Nguyen
*Assistant Examiner* — Anthony Taylor, Jr.
(74) *Attorney, Agent, or Firm* — Brinks Gilson & Lione

(57) ABSTRACT

An engine system having a coolant control valve unit includes: first and second valve members each having a rod protruding through a center part of the first and second valve members, respectively; a third valve member having a piston rod disposed through a center part of the third valve member; a temperature-sensitive driver attached to one side surface of the third valve member; a cam member contacted with an end part of the first and second rods and of the piston rod; and a cam member driver to rotate the cam member and control an opening of first, second, and third coolant passages by the first, second and third valve members, respectively. In particular, the other end part of the piston rod is inserted into the temperature-sensitive driver to push or pull the piston rod depending on a sensed temperature of the coolant.

9 Claims, 4 Drawing Sheets

(56) References Cited

U.S. PATENT DOCUMENTS

| | | | |
|---|---|---|---|
| 8,066,198 B2* | 11/2011 | Palanchon | G05D 23/1333 |
| | | | 236/100 |
| 8,701,603 B2* | 4/2014 | Warnery | F01P 7/167 |
| | | | 123/41.08 |
| 9,309,802 B2 | 4/2016 | Warnery et al. | |
| 9,581,072 B2* | 2/2017 | Hutchins | F01P 7/165 |
| 2012/0204819 A1* | 8/2012 | Dipaola | F01P 7/165 |
| | | | 123/41.08 |
| 2014/0374495 A1* | 12/2014 | Malone | F01P 7/14 |
| | | | 236/34.5 |

* cited by examiner

ENGINE SYSTEM HAVING COOLANT CONTROL VALVE

CROSS-REFERENCE TO RELATED APPLICATION

This application claims priority to and the benefit of Korean Patent Application No. 10-2015-0162679, filed on Nov. 19, 2015, the entire contents of which are incorporated herein by reference.

FIELD

The present disclosure relates to an engine system with a coolant control valve unit providing a safety valve function to a valve.

BACKGROUND

The statements in this section merely provide background information related to the present disclosure and may not constitute prior art.

Engines produce torque by burning a fuel, and discharge surplus thermal energy. Particularly, a coolant absorbs thermal energy as it circulates through an engine, a heater, and a radiator, and releases the thermal energy.

Oil becomes highly viscous at low engine coolant temperatures. With thick oil, friction and fuel consumption increase, and exhaust gas temperatures rise gradually, lengthening the time taken for catalyst activation and causing deterioration in exhaust gas quality. Moreover, it takes a long time to get a heater to function normally, so passengers and a driver will feel cold.

When the engine coolant temperature is excessively high, knocking may occur. If ignition timing is adjusted to suppress knocking, the engine performance may be degraded. In addition, excessive lubricant temperatures may result in poor lubrication.

However, one coolant control valve unit is used in specific regions of an engine, and is a valve that controls a number of cooling elements, like keeping the coolant at high temperatures and other regions at low temperatures.

When controlling the coolant by using one coolant control valve unit, the coolant control valve unit may be fixed and may be not properly operated, in this case, to inhibit the coolant from being overheated, a bypass line and a bypass valve must be separately installed to the coolant control valve unit.

However, as the bypass line and the bypass valve are separately disposed to the coolant control valve unit, a weight is increased, a number of parts is increased, and a volume of the coolant control valve unit is increased. Furthermore, a production cost and a maintenance cost may be increased.

SUMMARY

The present disclosure provides an engine system having a coolant control valve unit by actively controlling an opening of a valve member by a controller and a motor and by attaching a temperature-sensitive driver to the valve member to execute a safety valve function.

A coolant control valve unit according to one form of the present disclosure includes: a valve member configured to open/close a coolant passage; a piston rod disposed through a center part of the valve member; a temperature-sensitive driver which is attached to one side surface of the valve member and inserted by one end part of the piston rod, thereby being disposed pushing or pulling the piston rod depending on a sensed temperature of the coolant; a cam member pushing the other end part of the piston rod to open the coolant passage by the valve member; and a cam member driver rotating the cam member.

The temperature-sensitive driver may include a wax casing filled with a wax inside, and the wax may shrink and expand depending on a coolant temperature to push the piston rod to a side of the cam member or to pull the piston rod reversely.

An elastic member elastically supporting the valve member in the direction that the cam member is disposed may be further included.

An engine system having a coolant control valve unit according to one form of the present disclosure includes: a first valve member configured to close or open a first coolant passage by extending a first rod at one side of a center part; a second valve member to close or open a second coolant passage; a piston rod disposed through a center part of the second valve member; a temperature-sensitive driver which is attached to one side surface of the second valve member and inserted by one end part of the piston rod, thereby being disposed to push or pull the piston rod depending on a sensed temperature of the coolant; a cam member contacted with an end part of the first rod and the other end part of the piston rod; and a cam member driver disposed to rotate the cam member, thereby controlling an opening of the first and second coolant passages.

The temperature-sensitive driver includes a wax casing filled with a wax inside, and the wax may shrink or expand depending on the coolant temperature, thereby being disposed to push the piston rod to the side of the cam member or to pull the piston rod reversely.

An elastic member elastically supporting the valve member in the direction that the cam member is dispose may be further included.

An engine system having a coolant control valve unit according to another form of the present disclosure includes: a first and second valve members to open or close a first and second coolant passages by respectively extending a first and second rods from one side of a center part of the first and second valve members; a third valve member to open or close a third coolant passage; a piston rod disposed through a center part of the third valve member; a temperature-sensitive driver which is attached to one side surface of the third valve member and inserted with one end part of the piston rod, thereby being disposed to push or pull the piston rod depending on a sensed temperature of the coolant; a cam member contacted with an end part of the first and second rods and the other end part of the piston rod; and a cam member driver disposed to rotate the cam member and disposed to control an opening of the first, second, and third coolant passages.

The temperature-sensitive driver may include a wax casing filled with a wax inside, the wax may shrink or expand depending on the coolant temperature, thereby being disposed to push the piston rod to the side of the cam member or to pull the piston rod reversely, and an elastic member elastically supporting the third valve member in a direction that the cam member is disposed may be further included.

The first coolant passage may be connected to an oil cooler of the engine, the second coolant passage may be connected to a heater core or an EGR cooler, and the third coolant passage may be connected to a radiator.

The first, second, and third coolant passages may be disposed with a predetermined interval in the valve housing, the valve housing is supplied with the coolant exhausted from the cylinder head of the engine, and the supplied coolant may be respectively distributed through the first, second, and third coolant passages.

The cam member driver may include a motor, and the controller controls the motor depending on the sensed temperature of the coolant temperature to rotate the cam member, thereby respectively lifting the first, second, and third valve members.

According to the present disclosure, the opening of the valve member may be controlled by using the controller and the motor, in this case, the temperature-sensitive driver is attached to the valve member such that the valve member may stably open the coolant passage in the condition that the coolant is high temperature.

Also, in the state that the valve member is not opened/closed by the controller and the motor, since the temperature-sensitive driver opens or closes the valve member, the safety valve or the bypass valve is not separately required.

Also, by attaching the temperature-sensitive driver to the valve member opening/closing the coolant passage connected to the radiator, the high temperature stability of the coolant control valve may be improved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

DETAILED DESCRIPTION

Figure 1:
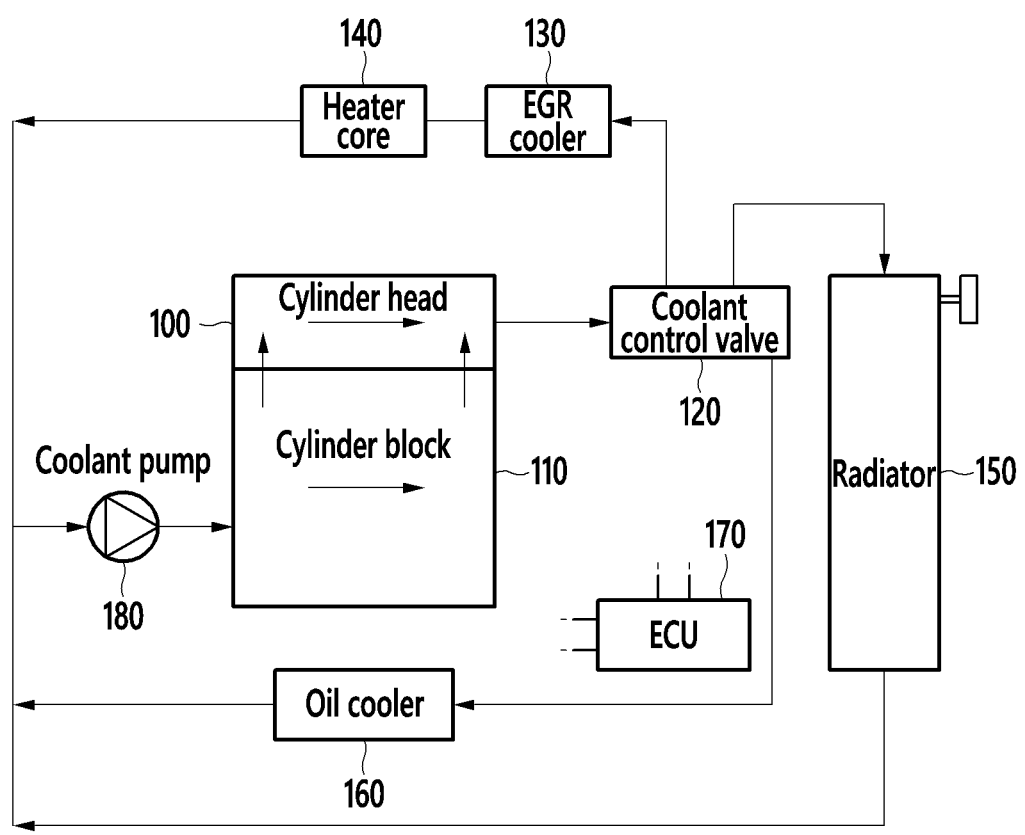
FIG. 1 is a schematic diagram showing an entire flow of a coolant in an engine system having a coolant control valve unit.

The following description is merely exemplary in nature and is not intended to limit the present disclosure, application, or uses. It should be understood that throughout the drawings, corresponding reference numerals indicate like or corresponding parts and features.

FIG. 1 is a schematic diagram showing an entire flow of a coolant in an engine system having a coolant control valve unit according to one form of the present disclosure.

Referring to FIG. 1, an engine system includes: a cylinder head 100, a cylinder block 110, a coolant control valve 120, an EGR cooler 130, a heater core 140, a radiator 150, oil cooler 160, coolant pump 180, and a controller 170 (i.e., an electronic control unit: ECU).

The coolant control valve 120 may be supplied with the coolant coming from the cylinder head 100, may control the coolant supplied to the EGR cooler 130 and the heater core 140, may control the coolant supplied to the radiator 150, and may control the coolant supplied to the oil cooler 160.

The controller 170 controls the coolant control valve 120, thereby respectively controlling the coolant distributed to the heater core 140, the EGR cooler 130, the radiator 150, and the oil cooler 160.

The coolant pump 180 intakes the coolant coming from the heater core 140, the EGR cooler 130, the radiator 150, and the oil cooler 160 and pumps the coolant to one side of the cylinder block 110.

A part of the coolant supplied to the cylinder block 110 is supplied to a lower side of the cylinder head 100 and the rest flows into an inner coolant jacket of the cylinder block 110. Also, the coolant supplied to the cylinder head 100 flows into the inner coolant jacket of the cylinder head 100.

The coolant passing through the cylinder head 100 and the coolant passing through the cylinder block 110 are summed and supplied to an inlet side of the coolant control valve 120.

The heater core 140 may execute a function of warming an indoor air by using the supplied coolant, and the EGR cooler 130 may function to cool the exhaust gas that is recycled from the exhaust line to the intake line by using the supplied coolant.

Furthermore, the oil cooler 160 may cool or heat the oil circulating the engine, or may transmit the heat of the oil by using the supplied coolant, and the radiator 150 may emit the heat of the supplied coolant to the outside.

Figure 2:
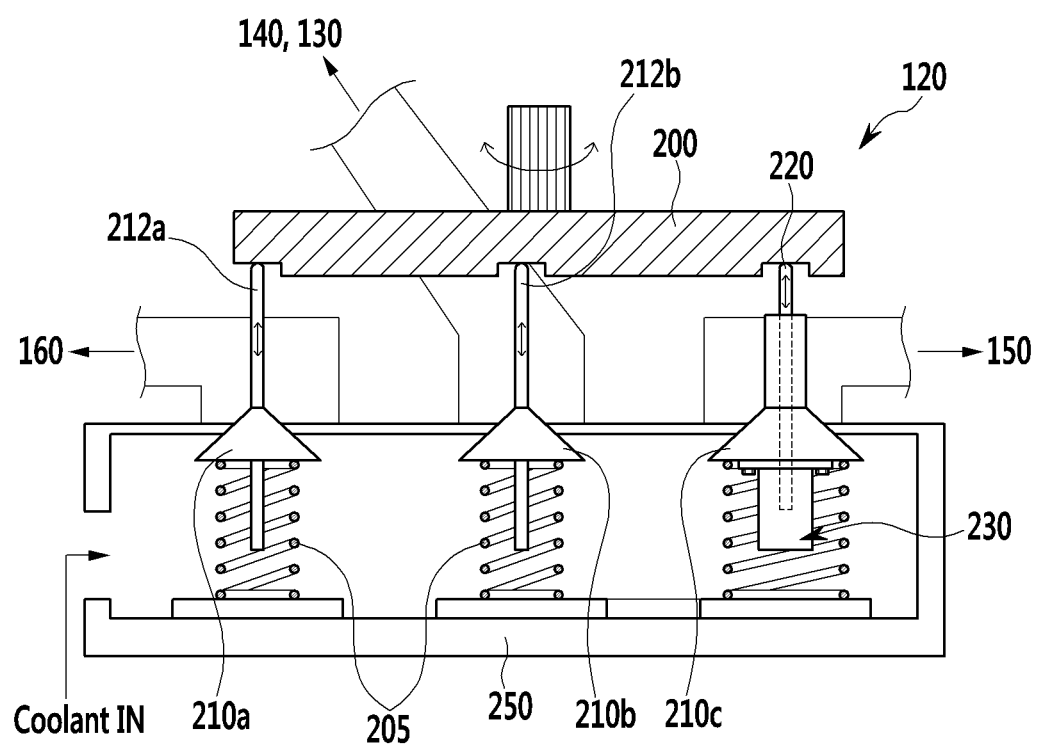
FIG. 2 is a schematic cross-sectional view of a coolant control valve unit.

FIG. 2 is a schematic cross-sectional view of a coolant control valve unit.

Referring to FIG. 2, the coolant control valve 120 includes a cam member 200, a first rod 212a, a second rod 212b, a piston rod 220, a first valve member 210a, a second valve member 210b, a third valve member 210c, an elastic member 205, a valve housing 250, and a temperature-sensitive driver 230.

A first, second, and third coolant passages are formed in the valve housing 250, the first valve member 210a is disposed to open/close the first coolant passage, the second valve member 210b is disposed to open/close the second coolant passage, and the third valve member 210c is disposed to open/close the third coolant passage.

The elastic member 205 is in contact with a lower surface of the first, second, and third valve members 210a, 210b, and 210c, the elastic member 205 elastically supports the first, second, and third valve members 210a, 210b, and 210c upwardly such that the upper end part of the first rod 212a, the second rod 212b, and the piston rod 220 are disposed above the first, second, and third valve members 210a, 210b, and 210c and is contacted to the lower surface of the cam member 200.

The first rod 212a extends upwardly in the upper center part of the first valve member 210a, and the end part thereof is contacted to one side of the lower surface of the cam member 200. The second rod 212b extends upwardly in the upper center part of the second valve member 210b, and the end part thereof is contacted to one side of the lower surface of the cam member 200.

Furthermore, the piston rod 220 is disposed through the center part of the third valve member 210c from bottom to top, the upper end part of the piston rod 220 is contacted to one side of the cam member 200, and the temperature-sensitive driver 230 is disposed at the lower surface of the third valve member 210c.

The temperature-sensitive driver 230 executes a function of pushing the piston rod 220 upwardly or pulling the piston rod 220 downwardly depending on the temperature of the coolant in the state that the temperature-sensitive driver 230 is attached to the lower surface of the third valve member 210c.

If the controller 170 controls to rotate the cam member 200 depending on the driving condition or the temperature of the coolant, the cam member 200 respectively pushes the first rod 212a, the second rod 212b, and the piston rod 220 downwardly, and the first valve member 210a, the second valve member 210b, and the third valve member 210c respectively close or open the first, second, and third coolant passages.

The first valve member 210a controls the coolant supplied to the oil cooler 160, the second valve member 210b controls the coolant supplied to the heater core 140 and the EGR cooler 130, and the third valve member 210c controls the coolant supplied to the radiator 150.

On the other hand, the cam member 200 may have a structure pushing the third valve member 210c downwardly through the piston rod 220. In this case, the position of the piston rod 220 is varied depending on the temperature of the coolant sensed by the temperature-sensitive driver 230, thereby varying the position that the cam member 200 closes and opens the third valve member 210c.

For example, when the temperature of the coolant sensed by the temperature-sensitive driver 230 is relatively high, the temperature-sensitive driver 230 pushes the piston rod 220 upwardly such that the opening of the third valve member 210c may be increased, when the sensed temperature of the coolant is relatively low, the temperature-sensitive driver 230 pulls the piston rod 220 downwardly such that the opening of the third valve member 210c may be decreased.

Also, if the coolant is overheated when the cam member 200 is not operated, the temperature-sensitive driver 230 pushes the piston rod 220 upwardly such that the third valve member 210c may be opened. Accordingly, as the temperature-sensitive driver 230 controls the opening of the third valve member 210c along with the cam member 200, the safety valve function may be realized and the opening of the third valve member 210c may be secondly controlled.

Accordingly, in the state that the third valve member 210c is not opened by the controller 170 and the motor 420, since the temperature-sensitive driver 230 opens and closes the third valve member 210c, the safety valve or the bypass valve is not separately required.

Also, as the temperature-sensitive driver is attached to the third valve member 210c closing and opening the coolant passage to the radiator 150, the high temperature stability of the coolant control valve 120 may be improved.

Again referring to FIG. 2, the piston rod 220 is installed to the third valve member 210c, however it may be selectively applied to the first valve member 210a or the second valve member 210b. Furthermore, in one form, the first rod may be only applied to the first valve member, and the piston rod may be only applied to the second valve member.

Figure 3:
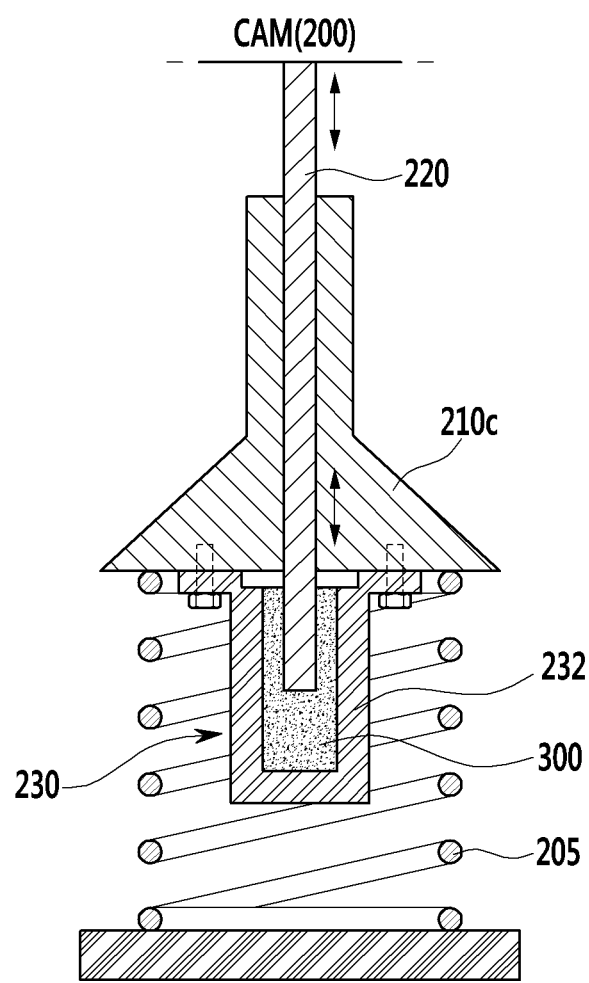
FIG. 3 is a partially detailed cross-sectional view of a coolant control valve unit.

FIG. 3 is a partially detailed cross-sectional view of a coolant control valve unit.

Referring to FIG. 3, the temperature-sensitive driver 230 includes a wax casing 232 and a wax 300, the wax casing 232 of the third valve member 210c is fixed and the wax 300 is filled in the wax casing 232.

Also, the piston rod 220 penetrates the center part of the third valve member 210c, and the lower end part of the piston rod 220 is inserted in the wax casing 232. The third valve member 210c is elastically supported upwardly by the elastic member 205, and the upper end part of the piston rod 220 is contacted to the lower surface of the cam member 200.

The wax 300 shrinks and expands depending on the temperature of the coolant transmitted via the wax casing 232 such that the piston rod 220 is lifted upwardly and is pulled downwardly.

Figure 4:
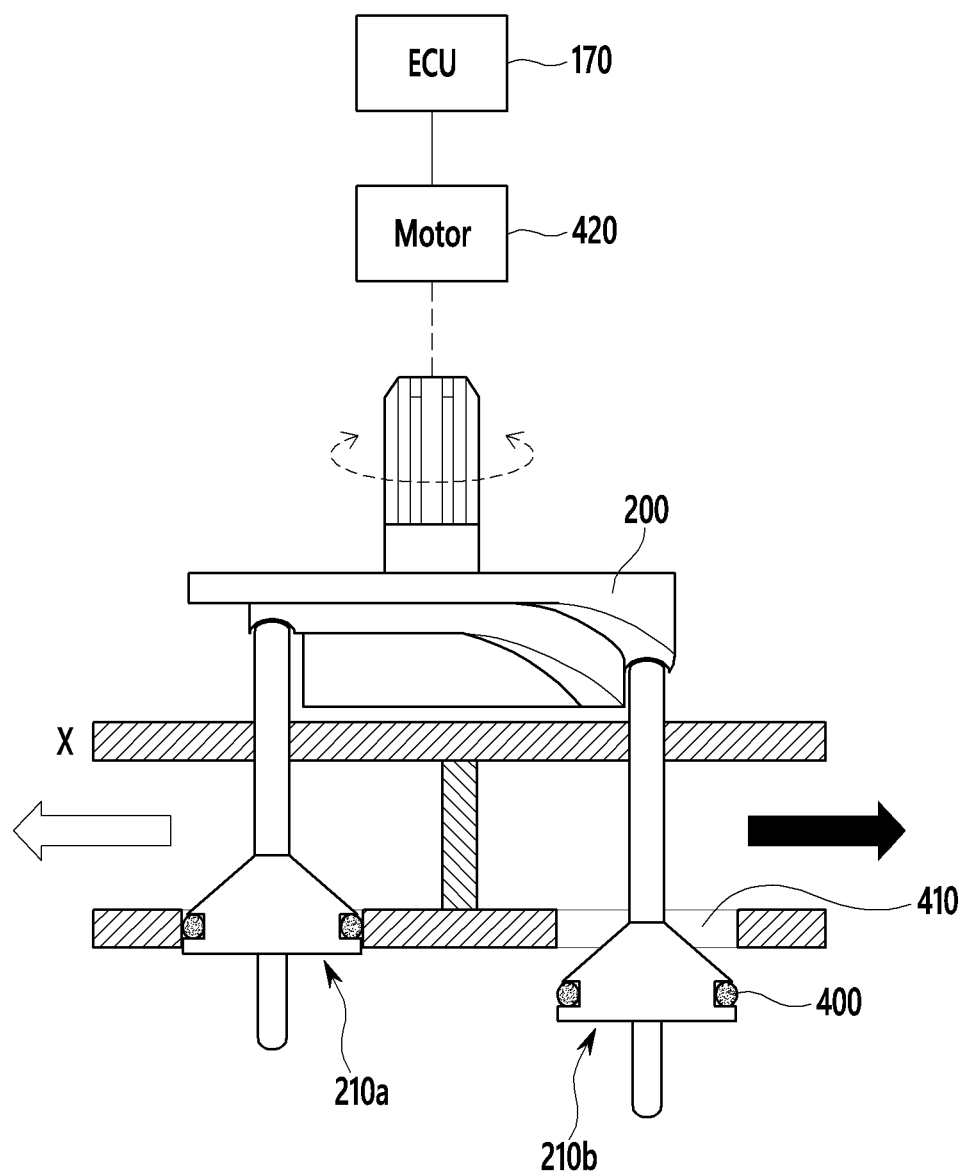
FIG. 4 is a partial exploded side view of a coolant control valve unit The drawings described herein are for illustration purposes only and are not intended to limit the scope of the present disclosure in any way.

FIG. 4 is a partial exploded side view of a coolant control valve unit according to one form of the present disclosure.

Referring to FIG. 4, the motor 420 is connected to the cam member 200, and the motor 420 rotates the cam member 200.

A cam member profile receiving the first and second valve members 210a and 210b is respectively formed in the lower surface of the cam member 200, and the cam member 200 pulls downwardly the first and second valve members 210a and 210b depending on the rotation position of the cam member, thereby having the structure of opening and closing the coolant passage.

Furthermore, a sealing member 400 forming a sealing structure along the interior circumference of the coolant passage 410 may be disposed in the exterior circumference of the first and second valve members 210a and 210b.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

100: cylinder head 110: cylinder block
120: coolant control valve 130: EGR cooler
140: heater core 150: radiator
160: oil cooler 170: controller
180: coolant pump 200: cam member
205: elastic member 212a: first rod
212b: second rod 220: piston rod
210a: first valve member 210b: second valve member
210c: third valve member 230: temperature-sensitive driver
232: wax casing 250: valve housing
300: wax 400: sealing member
410: coolant passage 420: motor

What is claimed is:
1. A coolant control valve unit comprising:
 a valve member configured to open or close a coolant passage;
 a piston rod disposed through a center part of the valve member;
 a temperature-sensitive driver attached to one side surface of the valve member;
 a cam member being in contact with a first end part of the piston rod and configured to push the first end part of the piston rod to open the coolant passage by the valve member; and
 a cam member driver configured to rotate the cam member,
 wherein a second end part of the piston rod inserts into a wax casing of the temperature-sensitive driver, and the wax casing is filled with a wax configured to shrink and expand depending on a coolant temperature, wherein the wax casing contacts and is fixed to a lower surface of the valve member by a fixing member, and the second end part of the piston rod directly contacts with the wax, and wherein the temperature-sensitive driver is configured to push or pull the piston rod, independently of operation of the cam member, relative to a side of the cam member so as to adjust an extent of opening of the coolant passage dependent on the operation of the cam member.

2. The coolant control valve unit of claim 1, further comprising:
an elastic member elastically supporting the valve member in a direction facing to the cam member.

3. An engine system comprising:
a coolant control valve unit including a first valve member configured to close or open a first coolant passage by extending upwardly or downwardly a first rod from a center part of the first valve member, and a second valve member configured to close or open a second coolant passage;
a piston rod disposed through a center part of the second valve member;
a temperature-sensitive driver which is attached to one side surface of the second valve member and inserted with a second end part of the piston rod, so that the temperature-sensitive driver is configured to push or pull the piston rod depending on a sensed temperature of a coolant;
a cam member contacted with an end part of the first rod and a first end part of the piston rod; and
a cam member driver configured to rotate the cam member, the cam member configured to control an opening of the first and second coolant passages,
wherein the second end part of the piston rod is inserted into a wax casing of the temperature-sensitive driver, and the wax casing is filled with a wax configured to shrink and expand depending on a coolant temperature,
wherein the wax casing contacts with and is fixed to a lower surface of the second valve member by a fixing member, and the second end part of the piston rod directly contacts with the wax, and
wherein the temperature-sensitive driver is configured to push or pull the piston rod, independently of operation of the cam member, relative to a side of the cam member so as to adjust an extent of opening of the second coolant passage dependent on the operation of the cam member.

4. The engine system of claim 3, further comprising an elastic member elastically supporting the second valve member in a direction facing to the cam member.

5. An engine system comprising:
a coolant control valve unit including first, second, and third valve members configured to open or close first, second, and third coolant passages, respectively;
a piston rod disposed through a center part of the third valve member;
a temperature-sensitive driver attached to one side surface of the third valve member and operatively connected to a second end part of the piston rod so as to push or pull the piston rod depending on a sensed temperature of a coolant;
a cam member contacted with an upper end part of a first rod of the first valve member, an upper end part of a second rod of the second valve member, and a first end part of the piston rod, each of the first and second rods being extended from a central part of corresponding valve members; and
a cam member driver configured to rotate the cam member and control an opening of the first, second, and third coolant passages,
wherein the second end part of the piston rod is inserted into a wax casing of the temperature-sensitive driver, and the wax casing is filled with a wax configured to shrink and expand depending on a coolant temperature,
wherein the wax casing contacts with and is fixed to a lower surface of the third valve member by a fixing member, and the second end part of the piston rod directly contacts with the wax, and
wherein the temperature-sensitive driver is configured to push or pull the piston rod, independently of operation of the cam member, relative to a side of the cam member so as to adjust an extent of opening of the third coolant passage dependent on the operation of the cam member.

6. The engine system of claim 5,
wherein an elastic member elastically supporting the third valve member in a direction facing the cam member is further included in the engine system.

7. The engine system of claim 5, wherein the first coolant passage is connected to an oil cooler of an engine, the second coolant passage is connected to a heater core or an EGR cooler, and the third coolant passage is connected to a radiator.

8. The engine system of claim 5, wherein the first, second, and third coolant passages are disposed with a predetermined interval in a valve housing, and the valve housing is supplied with the coolant coming from a cylinder head of an engine, and
wherein the supplied coolant is respectively distributed through the first, second, and third coolant passages.

9. The engine system of claim 5, wherein the cam member driver includes a motor, and a controller controls the motor depending on the sensed temperature of the coolant to rotate the cam member so as to respectively lift the first, second, and third valve members.

* * * * *